US006718479B1

(12) United States Patent
Christenson

(10) Patent No.: US 6,718,479 B1
(45) Date of Patent: Apr. 6, 2004

(54) METHOD, SYSTEM, PROGRAM, AND DATA STRUCTURES FOR MANAGING HIERARCHICAL TIMING WHEELS

(75) Inventor: David Alan Christenson, Elgin, MN (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 09/658,826

(22) Filed: Sep. 8, 2000

(51) Int. Cl.[7] ................................................. G06F 1/04
(52) U.S. Cl. ...................................................... 713/502
(58) Field of Search ................................ 713/500, 502, 713/600

(56) References Cited

U.S. PATENT DOCUMENTS

| | | | | |
|---|---|---|---|---|
| 5,091,872 A | * | 2/1992 | Agrawal | 703/14 |
| 5,297,275 A | * | 3/1994 | Thayer | 713/500 |
| 5,491,815 A | | 2/1996 | Basso et al. | |
| 5,768,572 A | * | 6/1998 | George et al. | 713/502 |
| 5,781,769 A | * | 7/1998 | Weber | 713/502 |
| 5,838,957 A | | 11/1998 | Rajaraman et al. | |
| 6,125,404 A | * | 9/2000 | Vaglica et al. | 709/400 |
| 6,360,329 B1 | * | 3/2002 | Kinkade | 713/502 |

OTHER PUBLICATIONS

G. Varghese et al., "Hashed and Hierarchical Timing Wheels: Efficient Data Structures for Implementing a Timer–Facility", IEEE/ACM Transactions on Networking, vol. 5, No. 6, Dec. 1997.

IBM, "Book E PowerPC Architecture Enhanced for Embedded Applications", Version 0.86, May 3, 1999, Chap. 11, pp. 311–329.

* cited by examiner

*Primary Examiner*—Dennis M. Butler
(74) *Attorney, Agent, or Firm*—Konrad, Raynes & Victor, LLP

(57) ABSTRACT

Disclosed is a method, system, program, and data structures for managing timers in timing wheel data structures in a computer readable medium. Each timer is enqueued in one slot in one of multiple timing wheels. Each timing wheel includes multiple slots and each slot is associated with a time value. Each slot is capable of queuing one or more timers. Each timer indicates a timeout value at which the timer expires. A register is decremented to zero and a determination is made of a current time. A determination is further made, in response to decrementing the register to zero, of a slot having a time value that expires at the determined current time. All timers in the determined slot having a timeout value expiring at the current time are then dequeued.

38 Claims, 9 Drawing Sheets

METHOD, SYSTEM, PROGRAM, AND DATA STRUCTURES FOR MANAGING HIERARCHICAL TIMING WHEELS

BACKGROUND OF THE INVENTION

1. Field of the Invention

The present invention relates to a method, system, and program for maintaining timers for system operations.

2. Description of the Related Art

Computer systems include a timer for failure recovery and for those programs and algorithms that require the measurement of time. For instance, certain failures are detected after an event does not occur within a specified period. Further programs require notification of the expiration of a period of time in order to know when to take a particular action.

It is desirable to provide a timer that measures time with a fine granularity, such as in microseconds. However, with many prior art timers, the finer the granularity of the time measurements, the increase in the number of interruptions to the processor each time a clock cycle occurs. During each tick, i.e., clock cycle, the processor is interrupted and would check if any timers provided for programs have expired. The processor overhead in responding to frequent interrupts can significantly degrade processor performance. Further, if many programs require a timer, then managing a large number of timers could also significantly increase the number of interrupts to the processor caused by clock cycles for each timer. Many operating systems have timers of coarse granulatiry (milliseconds or seconds) to reduce the frequency of interrupts to the processor.

Certain prior art timers utilize a timing wheel. A timer is a data structure created by a program that is set to expire after a specified interval of time. A timing wheel is a data structure into which timers are inserted as an array of lists. An overflow wheel may be provided for timers beyond the range of the arrays in the previous wheels. A timing wheel has a slot for each time cycle, or tick. The current time pointer points to a slot that may include timers for the current time. After a tick, the processor is interrupted to increment a time pointer to the next slot in the wheel. The processor increments the current time pointer each tick until it finds a non empty slot having one or more timers, and then processes all timer events in the slot. Prior art timing wheels are described in the article entitled "Hashed and Hierarchical Timing Wheels: Efficient Data Structures for Implementing a Timer Facility", by George Varghese and Anthony Lauck, in IEEE/ACM Transactions on Networking, Vol. 5, No. 6, pgs. 824–834 (December 1997), which publication is incorporated herein by reference in its entirety.

There is a need in the art for providing improved techniques for implementing a timing wheel of timers in a manner that minimizes the number of interruptions and burdens placed on the processor.

SUMMARY OF THE PREFERRED EMBODIMENTS

To overcome the limitations in the prior art described above, preferred embodiments disclose a method, system, program, and data structures for managing timers in timing wheel data structures in a computer readable medium. Each timer is enqueued in one slot in one of multiple timing wheels. Each timing wheel includes multiple slots and each slot is associated with a time value. Each slot is capable of queuing one or more timers. Each timer indicates a timeout value at which the timer expires. A register is decremented to zero and a determination is made of a current time. A determination is further made, in response to decrementing the register to zero, of a slot having a time value that expires at the determined current time. All timers in the determined slot having a timeout value expiring at the current time are then dequeued.

In further embodiments, the decrementer is set to a time value associated with one slot including at least one timer that will expire before the time values associated with other slots including timers.

In still further embodiments, a first wheel includes one slot for each time value, and a second wheel includes slots that each include a number of time values equal to all the slots in the first wheel. Yet further, a third wheel may be provided that comprises an overflow wheel that includes slots that each include a number of time values equal to all the slots in the second wheel. The overflow wheel slots are capable of including timers having timeout values that remain in the overflow wheel more than one rotation of the overflow wheel.

Preferred embodiments provide a timing wheel implementation for queuing timers from application programs that minimizes burdens on the processor. In preferred embodiments, the processor only has to respond to specific requests, such as to add a timer, stop a timer, etc., and when a decrementer reaches zero. In preferred embodiments, the decrementer is set to a time value associated with a slot including timers that will expire before the time values associated with other slots in the timing wheels. When the decrementer reaches zero, the processor will be interrupted to process the slot including timers that are due to expire. The preferred implementations improve processor performance over prior art timers where the processor is interrupted on each tick or clock cycle to check for expired timers.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
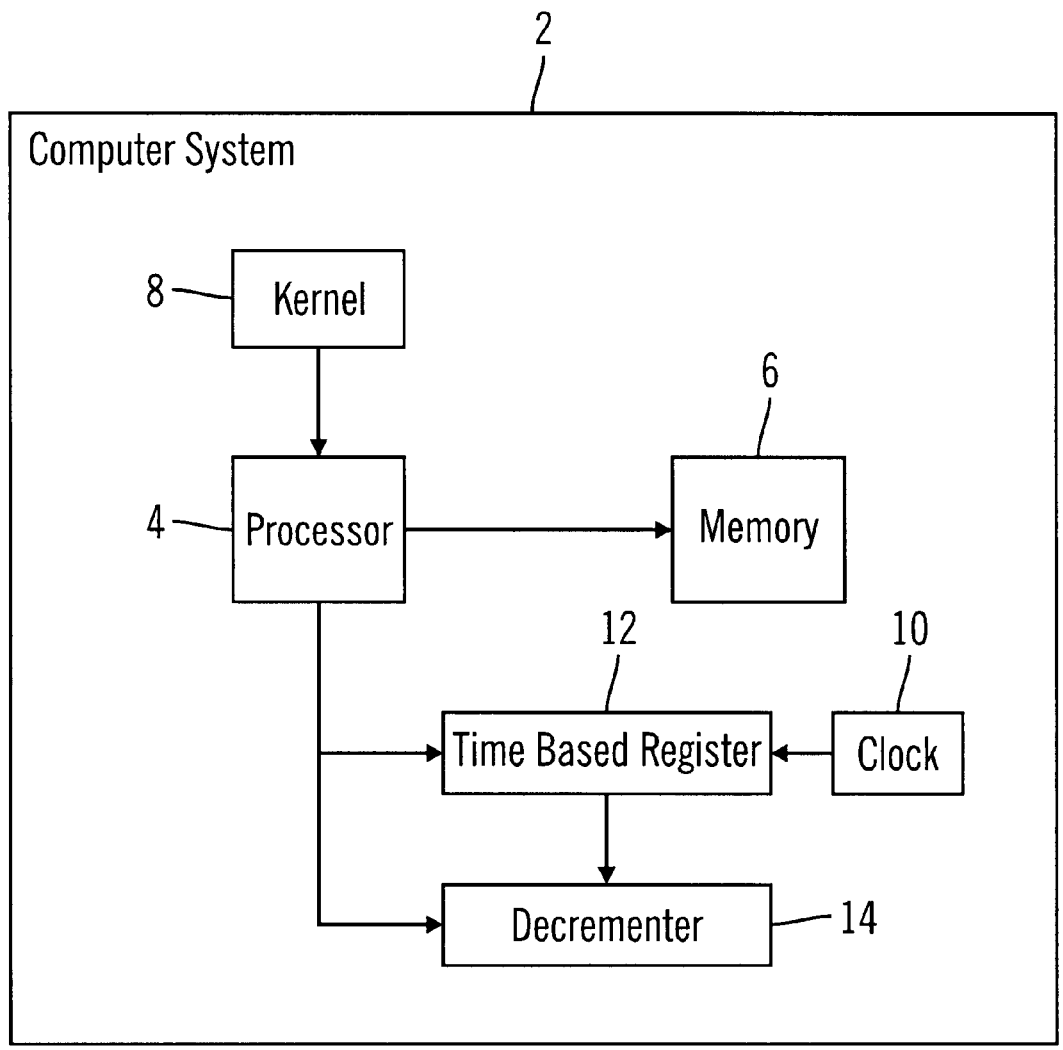
FIG. 1 is a block diagram illustrating a computing environment in which preferred embodiments of the present invention are implemented.

FIG. 1 illustrates a computer system 2 in which preferred embodiments are implemented. The computer system 2 includes a processor 4, which may include any processor device known in the art, such as a Power PC processor. The processor 4 can read and write data to a memory device 6, which may comprise a cache of the processor, e.g., L2 cache, or any other volatile memory device known in the art. The processor 2 operates under control of a kernel program 8 that is an operating system component loaded into the memory 6. The kernel 8 includes code for managing the timer operations described herein, as well as providing the underlying code to implement an operating system in which application programs can execute. A clock 10, which may comprise the main system clock, generates clock ticks or clock cycles at a constant rate. For personal computers, a clock typically operates at a rate of 66Hz (cycles/second).

A time based register 12 is incremented upon each clock 10 tick, without the involvement of the processor 4. In preferred embodiments, the time based register 12 is implemented as two 32-bit hardware register, providing bits 0 to 63. A decrementer register 14 decrements upon each tick that increments the time base register 12. The value in the decrementer 14 may be set by the processor 2. In preferred embodiments, the decrementer 14 comprises a 32-bit hardware register. The computer system 2 would further include a bus to allow the processor 4 to communicate with various Input/Output devices and execute an operating system that manages the simultaneous execution of multiple application programs (not shown). Further details of the components in the computer system 2, including the processor 4, memory 6, time based register 12 and decrementer 14 are described in the International Business Machines Corporation (IBM) publication "Book E: PowerPC Architecture Enhanced for Embedded Applications", Version 0.86 (Copyright IBM, May 1999), which publication is incorporated herein by reference in its entirety.

Figure 2:
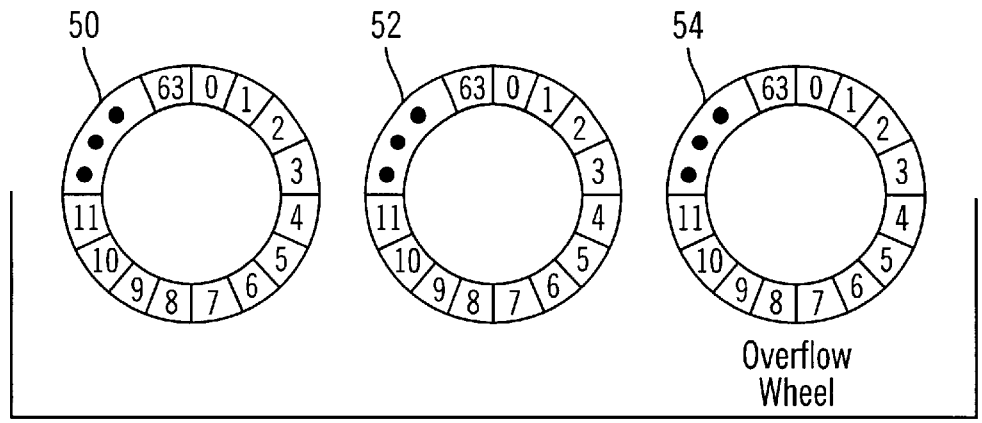
FIG. 2 illustrates a timing wheel data structures in accordance with preferred embodiments of the present invention.

The processor 4, operating under control of the kernel 8, maintains data structures in the memory 6 to implement the timers in accordance with the preferred embodiments. In preferred embodiments, timers to measure a time interval for different application programs running in the computer system 2 are maintained in hierarchical timing wheel data structures that the processor 4 stores in memory 6. FIG. 2 illustrates an implementation of a hierarchical timing wheel including three wheels 50, 52, and 54. Each wheel has sixty-four slots numbered 0 to 63. The wheels are arranged in a hierarchical order, such that wheel 50 rotates one slot for each clock 10 tick and wheel 52 rotates one slot every 64 clock 10 ticks, or complete rotation of wheel 50. Wheel 54 is an overflow wheel that holds timers longer than the time interval provided by wheels 50 and 52, which comprises 64×64 or 4096 ticks. Wheel 54 would rotate one slot for each complete rotation of wheel 52. In further embodiments, any number of wheels may be provided. In general, wheel n rotates one slot for every complete rotation of wheel (n−1). Further, as the tick interval gets smaller, i.e., the clock cycle increases, then more timing wheels are required.

Figure 3:
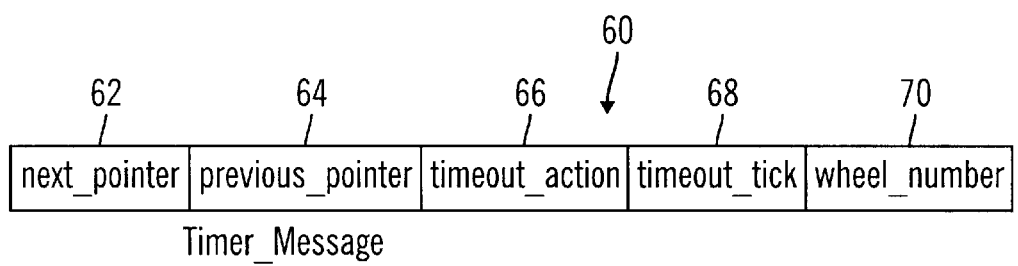
FIG. 3 illustrates a data structure of a timer message in accordance with preferred embodiments of the present invention.

Each slot in a wheel 50, 52, 54 includes a doubly linked list of timers. FIG. 3 illustrates a preferred embodiment data structure of a timer_message 60, that comprises the timer data structure, that is added to the appropriate slot in one of the timing wheels 50, 52, 54 based on an expiration time specified by the program that requested the timer. The timer _message 60 is generated from information provided by the application requesting a timer. A timer _message 60 includes the following fields:

next_pointer 62: this pointer is used to link the current timer _message to a doubly linked slot list by pointing to the next timer_message in the doubly linked slot list.

prev_pointer 64: this pointer is used to link the current timer _message to a doubly linked slot list by pointing to the previous timer_message in the doubly linked slot list.

timeout_action 66: action to perform when a timer expires, such as a function or call to an operation.

timeout_tick 68: The absolute expiration time of the timer in ticks. wheel_number 70: The wheel number in which the timer _message is included.

The processor 4 would generate the timer_message based on a timeout action 66 and timeout_tick 68 provided by an application program requesting a timer. The other fields, such as the next_pointer 62, prev_pointer 64, and wheel_number 70 would be generated according to logic described below when a timer_message 60 is enqueued in a slot of one of the wheels 50, 52, 54.

Figure 4:
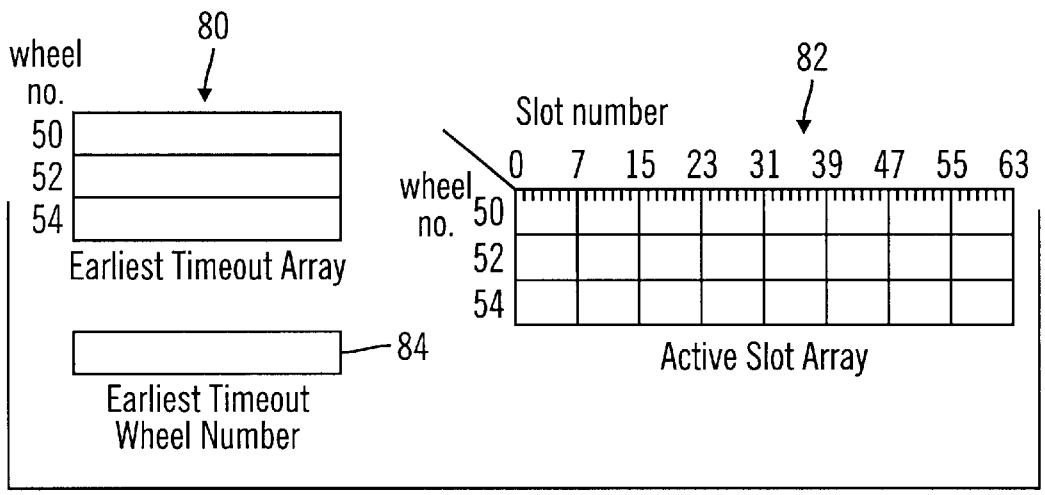
FIG. 4 illustrates data structures used to manage timer__ messages in the timing wheel data structures in accordance with preferred embodiments of the present invention.

FIG. 4 shows three additional data structures the processor 4 maintains in memory 6, including an earliest timeout array 80, active slot array 82, and an earliest timeout wheel number 84. An earliest timeout array 80 includes an entry for each wheel number 50, 52, 54 that provides the earliest expiration time in absolute ticks, i.e., the timeout_tick 68, for all timer _messages in the wheel. The earliest timeout wheel number 84 indicates the wheel number containing the earliest timeout_tick 68, i.e., the timeout_tick, that will expire the soonest for all wheel numbers 50, 52, 54. This earliest timeout wheel number 84 is used as an index into the earliest timeout array 80 to select the earliest timeout_tick 68, timer due to expire first across all wheels. The active slot array 82 provides a row of 64 bits, one for each slot in a wheel 50, 52, 54. A bit value of "on" indicates that the slot corresponding to that bit value has active timers, i.e., queued timer_messages 60. In this way, the active slot array 80 keeps track of the slots in the wheels that have active timers.

The basic timer related functions include:

start_timer(interval, timeout_action, handle): an application program calls the start_( )timer function to start a timer that will timeout after an "interval", which is a number of ticks. The specified timeout_action is performed after the interval of ticks occur. The handle is returned to the application program to use to stop the timer.

stop_timer(handle): The application program calls the stop_timer( ) function to stop the timer before it expires.

timeout( ): this function is called when a timer expires. This function examines the current slot and performs the requested timeout_action 66 for the expired timers and re-enqueues timers with remaining time to lower order slots and/or timing wheels. Thus, over time, a timer_message 60 is moved to earlier slots as the expiration time hastens.

Figure 5:
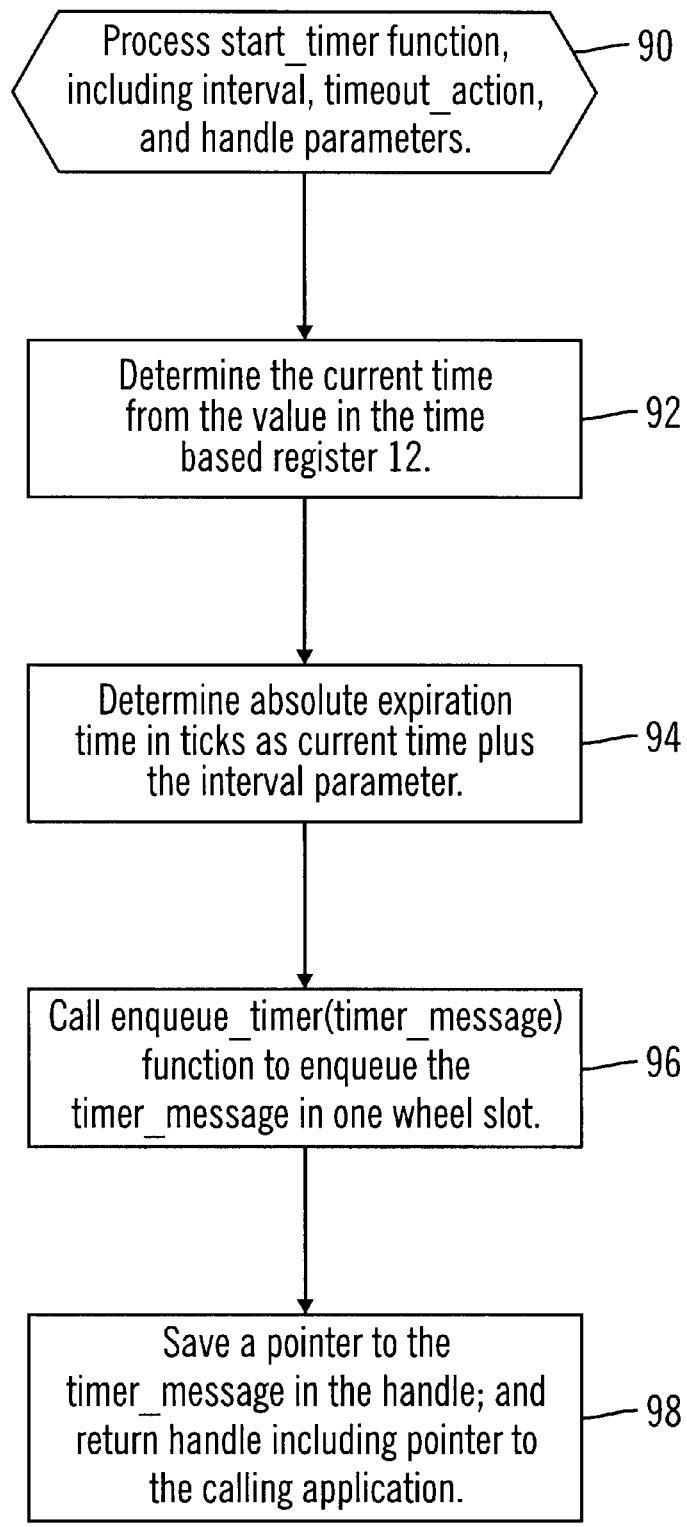
FIG. 5 illustrates logic to start a timer for an application or program in accordance with preferred embodiments of the present invention.

FIGS. 5–11 illustrate logic implemented in the kenrel 8 code to manage the timing wheels 50–54 and timers generated in response to requests from any application or program executing in the computer system 2. FIG. 5 illustrates logic implemented in the kernel 8 code to handle a request from an application or program for a timer. At block 90, the processor 4 receives a call to the start_timer( ) function, including as parameters an interval, which is a number of ticks before the timer expires, a timeout_action to perform upon expiration, and a handle to use as a pointer to the generated timer_message 60. In response, the processor 4 determines (at block 92) the current time from the value in the time based register 12. Determining the current time may require an operation to convert the time based register 12 value to a tick value. Alternatively, no conversion may be necessary if the time based register 12 is already the tick value used in the timer related operations. The processor 4 then determines (at block 94) the absolute expiration time in ticks by adding the determined current time to the interval included with the start_timer call. The processor 4 calls (at block 96) the enqueuetimer( ) function to generate and enqueue a timer_message for the start_timer( ) call. After the timer is enqueued, the processor 4 saves (at block 98) a pointer to the enqueued timer_message 60 in the handle and returns the handle to the application or program invoking the start_timer( ) function.

Figure 6:
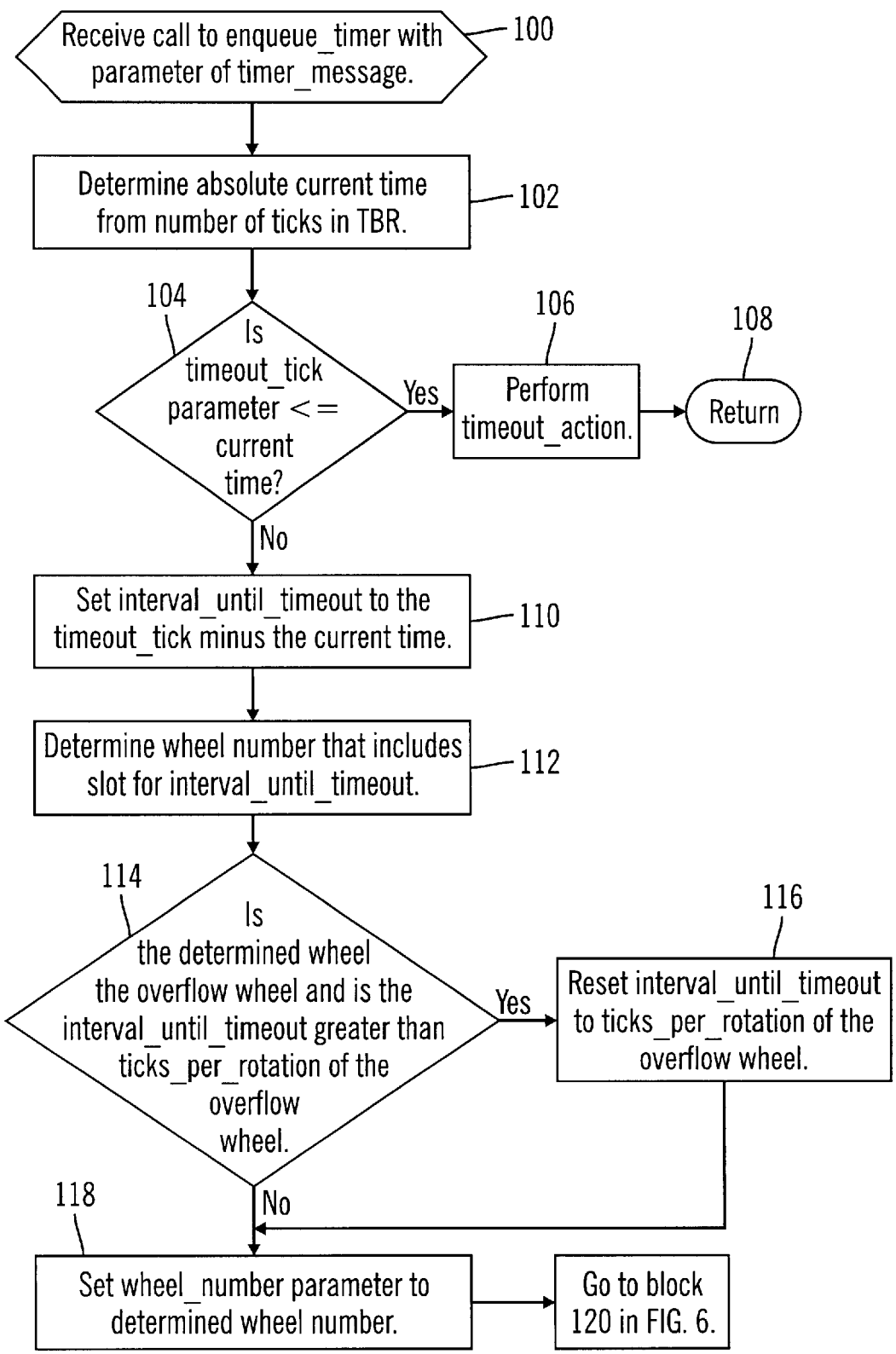
FIGS. 6 and 7 illustrate logic to enqueue a timer in a timing wheel data structure in accordance with preferred embodiments of the present invention.

FIG. 6 illustrates logic to process a call (at block 100 to the enqueue_timer( ) function to enqueue a timer_message 60 in the appropriate slot in one of the wheels 50–54. In response, the processor 4 determines the absolute current time in ticks from the value in the time based register 12. This may involve no conversion if the time based register 12 maintains ticks, or some conversion of the value in the register 12 to a number of ticks. If (at block 104) the timeout_tick 68, which is a parameter in the timer_message 60 indicating the absolute time in ticks for the timeout, is less than or equal to the absolute current time, then the timer has expired and the processor 4 performs (at block 106) the timeout_action 66 specified in the timer _message 60. After performing the timeout_action at block 106, the logic ends as the timer_message to enqueue has expired and control returns (at block 108) to block 96 in FIG. 5 to the start_timer ( ) function to complete the process of generating the timer_message 60.

If the timer_message 60 has not expired, then the processor 4 sets (at block 110) an interval_unit timeout variable to the timeout_tick 68 minus the current time, which indicates the number of ticks from the current time when the timer_message expires, i.e., the relative expiration time. The processor 4 then determines (at block 112) the wheel number 50–54 of the wheel having a slot with timeout values equal to the interval_until_timeout ticks. This is the wheel in which the timer_message will be enqueued. For instance, wheel 50 would include one slot for each of the first 64 ticks, wheel 52 includes slots for the 64$^{th}$ to 4095$^{th}$ tick where each slot can include 64 different time values, and overflow wheel 54 includes a slot for any tick intervals beyond the 4095$^{th}$ tick. In preferred embodiments, this wheel number that includes a slot timing out at the interval _until_timeout value may be calculated from equation (1) below:

$$\text{MIN}((64-\text{cntlzd}(\text{interval\_until\_timeout})-1)/6, 2) \qquad (1)$$

The command "cntlzd" is the count leading zero command that counts the number of zeros from the leftmost bit position until the first binary 1 is encountered. This equation assumes that there are 64 slots in each wheel, requiring 6 bits to index, and that the interval_until_timeout is a 64 bit double word. The result of the division operation is the integer value of the division operation. For instance, if the interval unit_timeout is less than sixty-four ticks, then there would be at least 58 zeros from the leftmost end of the 64 bit word to a maximum decimal value of 63, thereby producing a integer division result of zero that indicates the first wheel 50.

The processor 4 then determines (at block 114) whether the determined wheel is the overflow wheel and whether the interval_until_timeout is greater than the ticks_per_rotation of the overflow wheel. The ticks_per_rotation may be calculated by first deterimining a shift count for the wheel number, which equals the number of bits required to index the slots of a timing wheel times the wheel number. For instance, when there is a slot for each of the first 64 ticks, six bits are needed to index each possible 64 slots as six bits are needed to express decimal 63. The ticks per rotation can be calculated by shifting the binary bits representing decimal 63 the calculated shift_count to the left. For instance, for the second wheel 52, the ticks_per_rotation would comprise the binary value b0000 1111 1100 0000. If the interval_until_timeout is greater than the ticks_per_rotation of the overflow wheel, then the interval_until_timeout is set (at block 116) to the ticks_per_rotation of the overflow wheel 54. This ensures that the timer_message 60 is enqueued in the last entry of the overflow wheel 54 to remain in the overflow wheel 54 for multiple rotations. From block 116 or from the "No" branch of block 114 (if the wheel is not the overflow wheel 54 and the interval_until_timeout is not greater than the ticks_per_rotation), then the wheel_number 70 parameter of the timer_message 60 is set (at block 118) to the determined wheel number.

Figure 7:
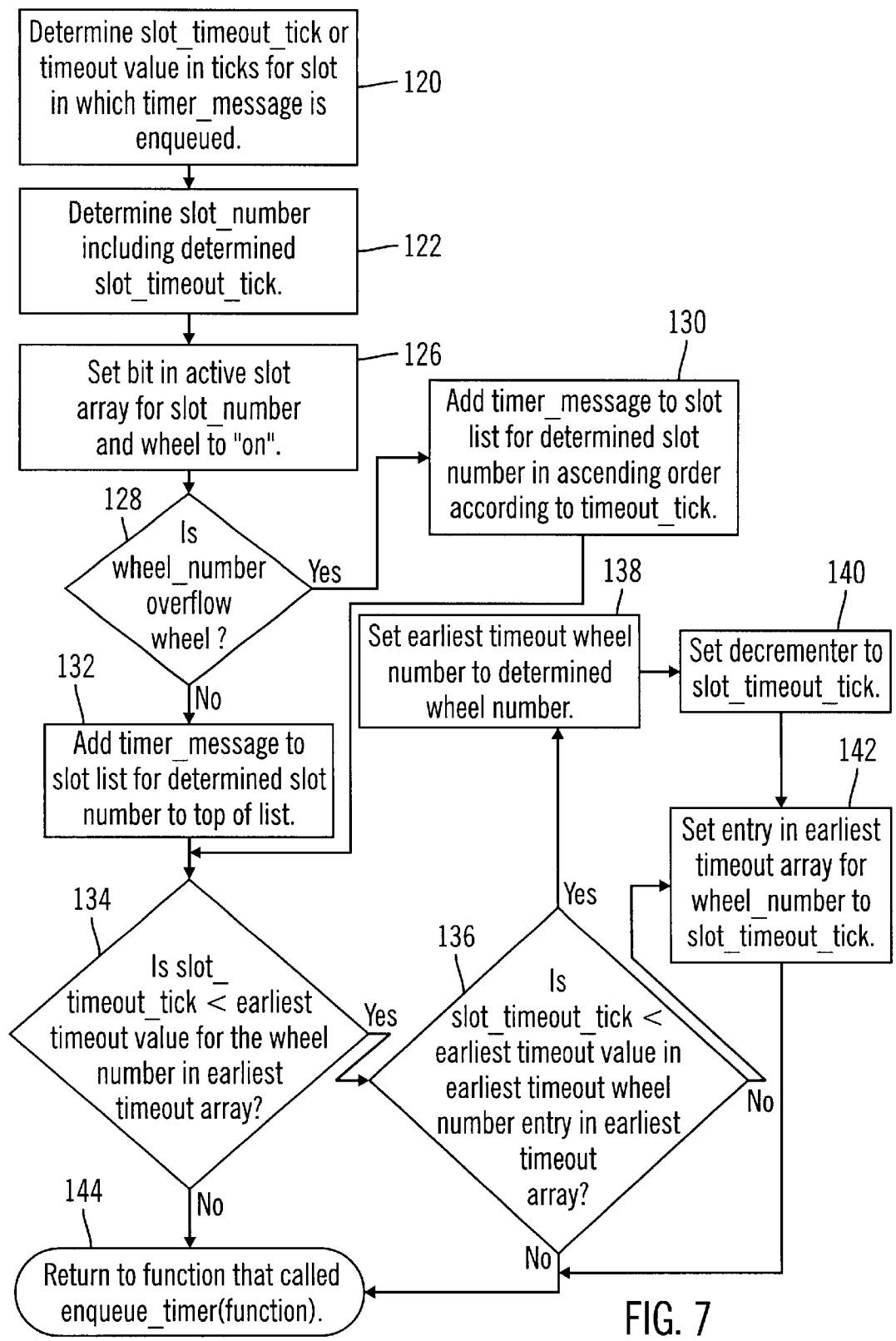

From block 118, control proceeds to block 120 in FIG. 7, where the processor 4 determines the slot_timeout_tick, which is the absolute timeout value for the slot in the wheel 50–54 in which the timer_message will be enqueued. In preferred embodiments, the slot_timeout_tick may be calculated as a function of the wheel_number 70 and timeout_tick 68 in the timer_message 60 using equation (2) below:

$$\text{timeout\_tick \&} \sim ((1 << (\text{shift count for wheel\_number}))-1) \qquad (2),$$

where "&" is a logical AND operator, "~" is a logical complement operator, and "<<" is a left shift operator.

The processor 4 further determines (at block 122) the slot_number in the wheel_number 70 having the determined slot_timeout_tick. In preferred embodiments, the slot_number may be calculated as a function of the wheel_number 70 and timeout_tick 68 using equation (3) below:

$$(\text{timeout\_tick} >> (\text{shift count for wheel number})) \% 64 \qquad (3),$$

where "%" is a Modulo operator.

The processor 4 then sets (at block 126) the bit in the active slot array 82 for the determined slot_number and wheel_number 70 to "on" to indicate that the slot_number includes active timers. If (at block 128) the wheel_number 70 is the overflow wheel 50, then the processor 4 enqueues (at block 130) the timer_message 60 to the slot list for the determined slot_number in ascending order according to the timeout_tick 68 value. In preferred embodiments, the slot list comprises a doubly linked list. The timers in the slots in the overflow wheel 54 are sorted in ascending order because each slot allows for multiple timeout_tick values. Otherwise, if the wheel_number 70 is the first 50 or second 52 wheel, then the timer _message 60 is enqueued (at block 132) at the top of the slot list.

Figure 8:
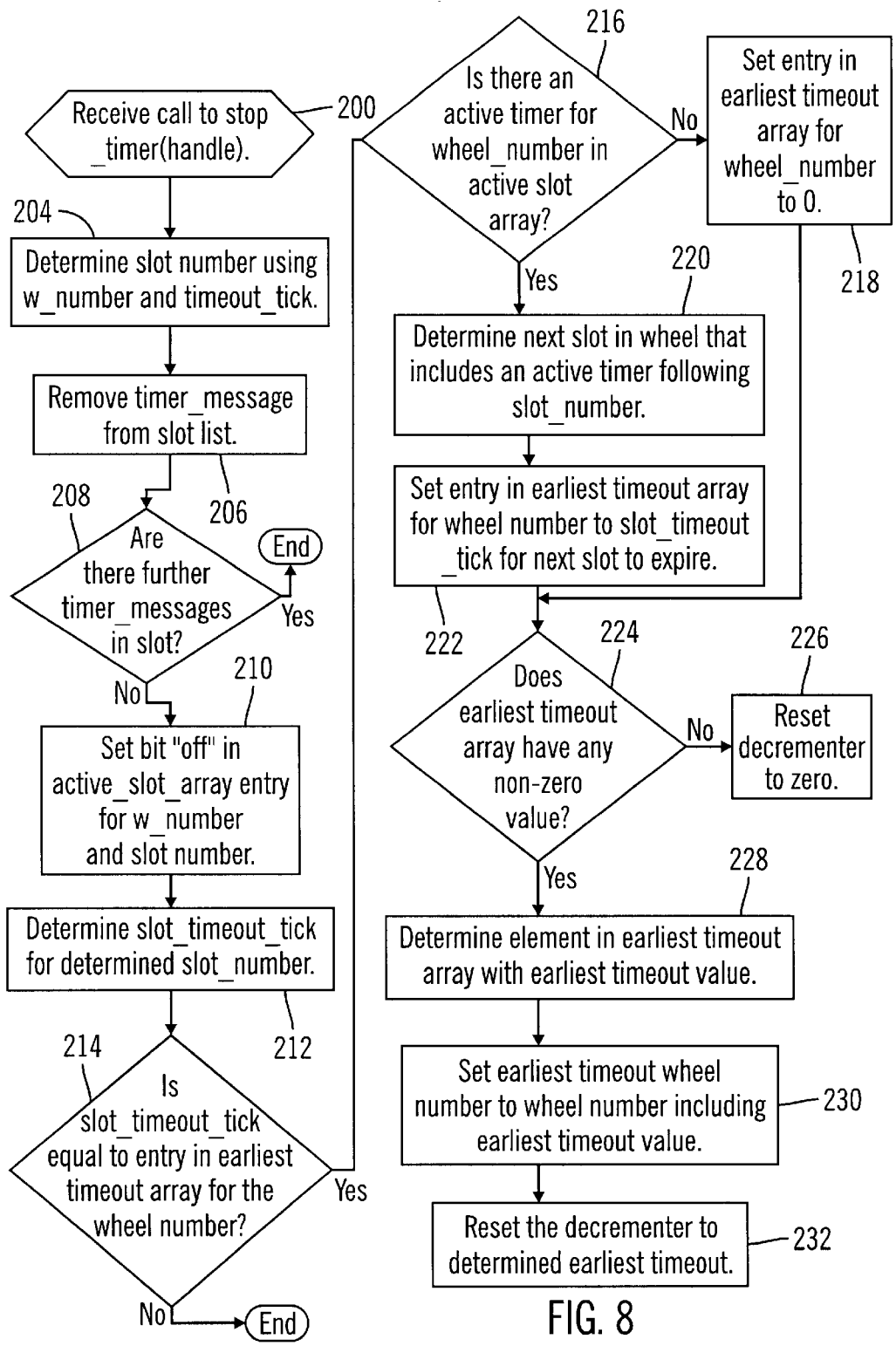
FIG. 8 illustrates logic to stop a timer in accordance with preferred embodiments of the present invention.

From blocks 130 or 132, control proceeds to blocks 134 to 142 where the processor 4 resets values in the earliest timeout array 80 or earliest timeout wheel number 84 if necessary. If (at block 134) the slot_time out_tick is less than the earliest timeout value entry for wheel_number 70 in the earliest timeout array 80, then the earliest timeout value in the array 82 for the wheel_number 70 needs to be reset. In such case, if (at block 136) the slot_timeout_tick is also less than the timeout value in the earliest timeout array 80 for the earliest timeout wheel number 84, i.e., the earliest time value in the entire array 80, then the processor 4 sets (at block 138) the earliest timeout wheel number 84 to the determined wheel_number 70 and sets (at block 140) the decrementer 14 to the slot_timeout_tick. To set the value in the decrementer 14, the processor 4 may have to use a conversion factor to convert ticks to the decrementer 14 value. The processor 4 further sets (at block 142) the entry in the earliest timeout array 80 for the wheel_number 70. Control then proceeds to block 144 to return control to the function that called the enqueue_timer ( ) function initiated at block 100. FIG. 8 illustrates logic in the kernel 8, executed by the processor 4, to handle a all at block 200 to the stop_timer function, requesting to stop a specific enqueued timer_message identified by the handle. The processor 4 would determine (at block 204) the slot_number including the timer_message 60 addressed by the handle included in the stop_timer( ) call. The slot_number may be calculated using the wheel_number 70 and timeout_tick 68 in the manner described above with respect to block 122 in FIG. 7. The processor 4 then removes (at block 206) the requested timer_message from the slot list for the determined slot number. If (at block 208) there are no further timer_messages 60 in the slot list for the determined slot_number, then the bit in the entry of the active slot array 82 for the wheel_number 70 and determined slot_number is set to "off".

If the removed timer _message 60 was the last timer in the slot, then the processor at block 212 to 230 may have to reset the earliest timeout values. For this purpose, the processor 4 determines (at block 212) the slot_timeout_tick for the determined slot_number, which is the absolute timeout value for that slot. The slot_timeout_tick may be calculated as described with respect to block 120 in FIG. 7. If (at block 214) the slot_timeout_tick is equal to the entry in the earliest timeout array 80 for the wheel_number 70, then the slot_number from which the timer_message 60 was removed is the next slot that will expire. If the slot_number from which the timer_message 60 was removed is not the next slot to expire, then the routine ends as there is no need to reset any of the earliest timeout values.

Otherwise, if the slot_timeout_tick is the next slot to expire, then the processor 4 determines (at block 216) whether there is an active timer for the wheel_number 70 in the active slot array 82 following the slot_number from which the timer_message 60 was removed. If there are no further active timers for the wheel_number, then the entry in the earliest timeout array 80 for the wheel_number is set to zero. Otherwise, if there is a next active timer, then the processor 4 uses the active slot array 82 to determine (at block 220) the next slot in the wheel following the slot from which the timer_message 60 was removed that includes an active timer. The processor 4 then sets (at block 222) the entry in the earliest timeout array 80 for the wheel_number to the slot_timeout_tick for the determined next slot to expire.

From block 218 or 222, the processor 4 determines (at block 224) whether the earliest timeout array 80 has any non-zero values. If not, the decrementer 14 is set (at block 226) to zero. Note that setting the decrementer 14 to zero in this case will not trigger the call to the timeout( ) function described in FIG. 9 because no timer has expired. Otherwise, the processor 4 determines (at block 228) the earliest timeout value in the earliest timeout array 80, across all wheel numbers. The earliest timeout wheel number 84 is set (at block 230) to the wheel number having the earliest timeout value in the earliest timeout array 80. The decrementer 14 is further set (at block 232) to the determined earliest timeout value in the earliest timeout array 80.

Figure 9:
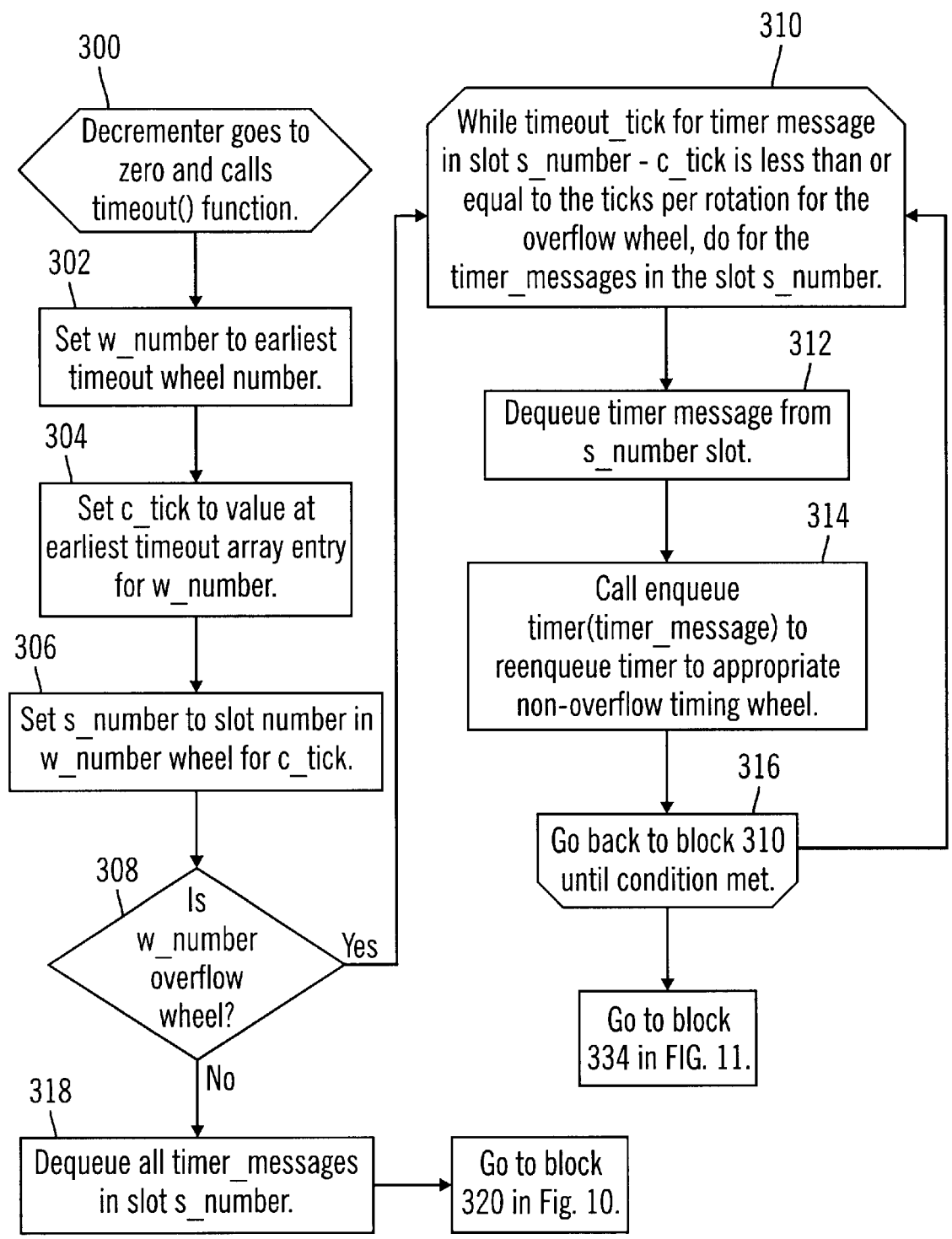
FIGS. 9–11 illustrate logic to handle completed timers in accordance with preferred embodiments of the present invention.
Figure 10:
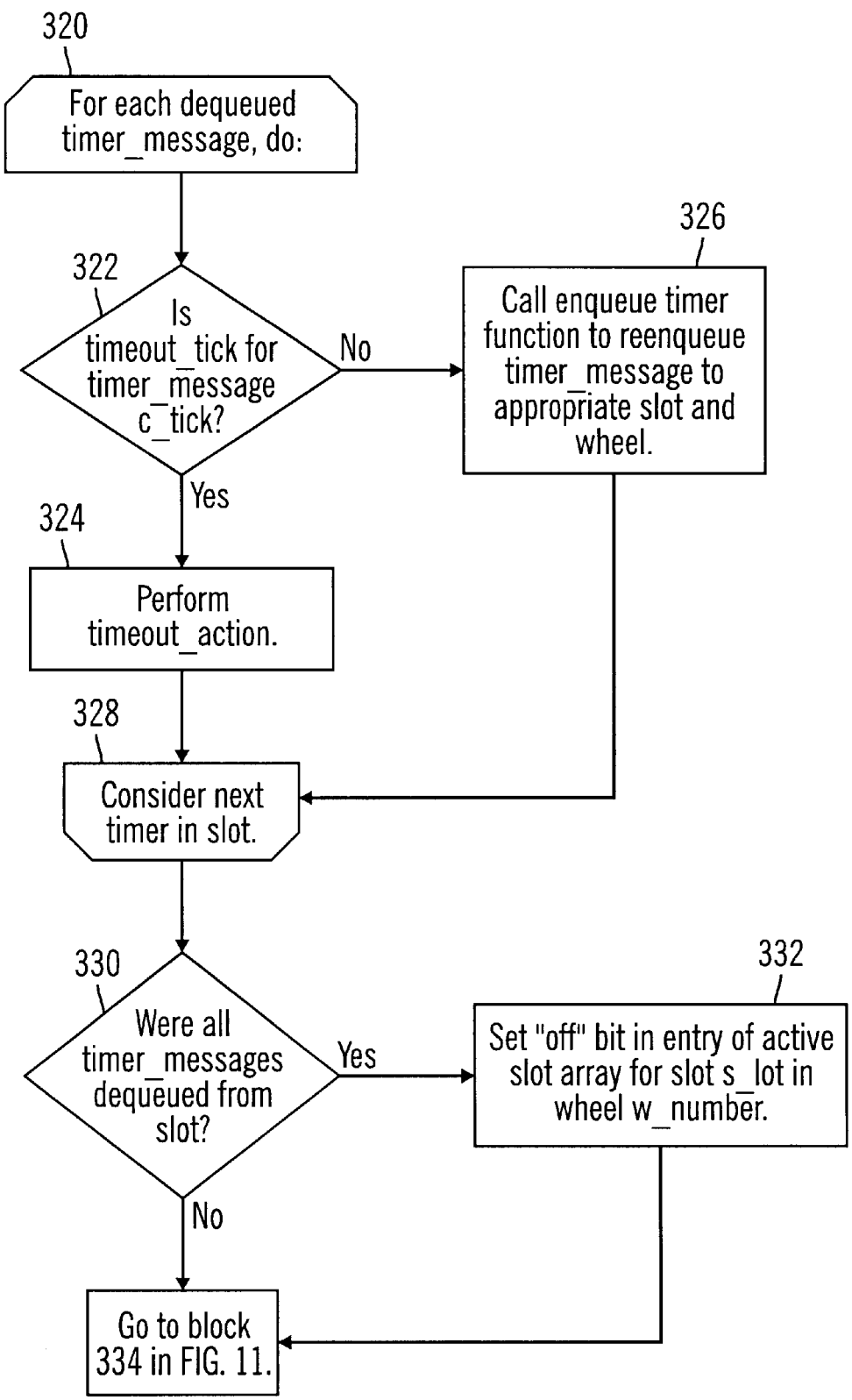
Figure 11:
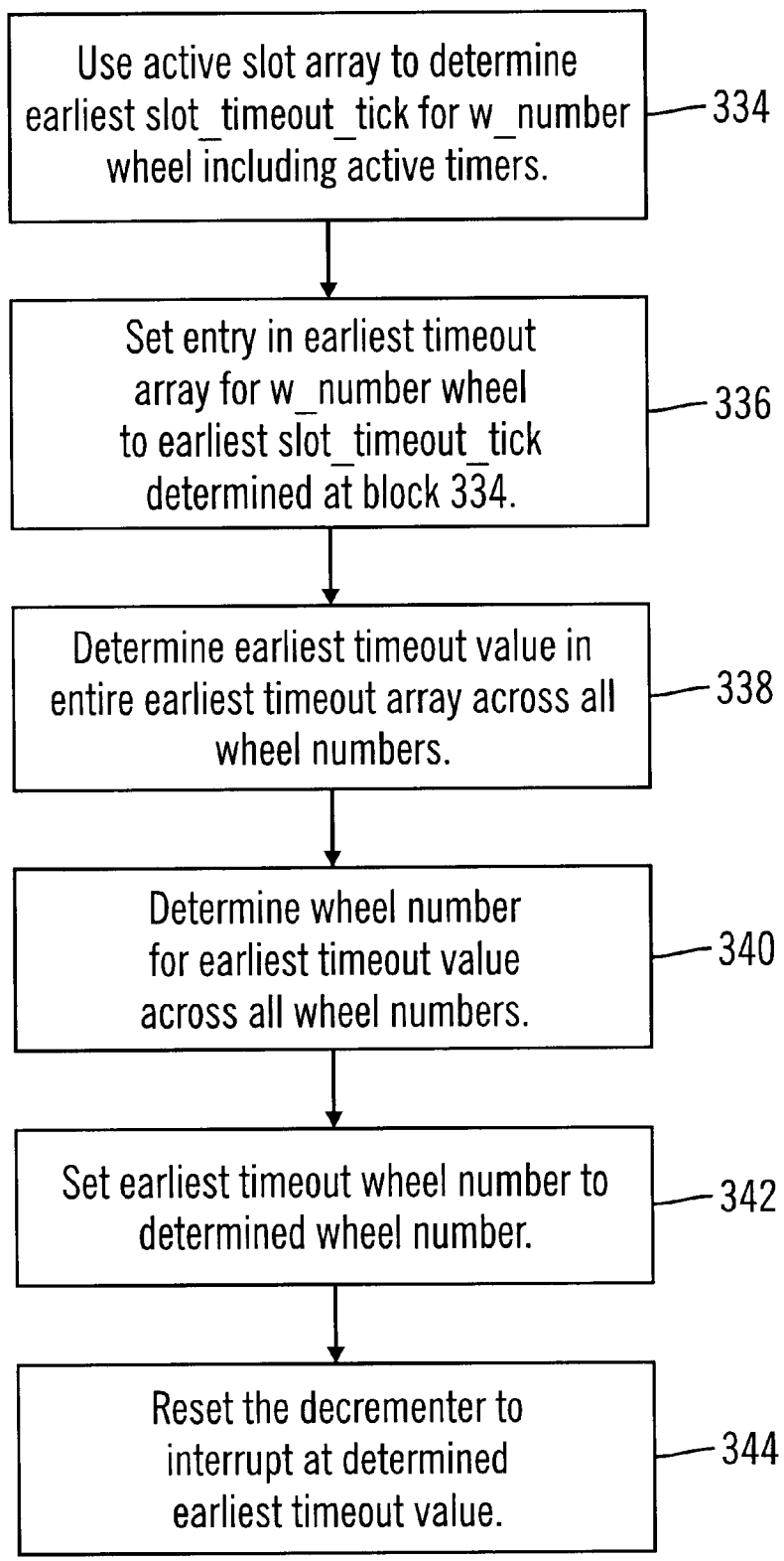

FIG. 9 illustrates logic implemented in the kernel 8 to process a call to a timeout( ) function at block 300 that is invoked when the decrementer 14 reaches zero. For instance, a message may be generated to the kernel 8 when the decrementer 14 reaches zero that triggers the kernel 8 to invoke a timeout( ) function. In response to the timeout function, the processor 4 sets (at block 302) a w_number variable to the earliest timeout wheel number 84 and sets (at block 304) a c_tick variable to the time value in the earliest timeout array entry for wheel w_number. Because the decrementer 14 is set to the timeout value for the slot that will be the next or earliest to expire, the current time (c_tick) when the decrementer 14 reached zero is the earliest time value in the earliest timeout array. The s_number is set (at block 306) to the slot_number in wheel w_number for the c_tick. The slot_number may be determined using the operation described with respect to block 122 in FIG. 7, that would use the w_number and c_tick as parameters. If (at block 308) the w_number is the overflow wheel 54 number, then a loop is performed at block 310 to 316 while the timeout_tick 68 for timer_messages 60 in the s_number slot minus the c_tick (current tick time) is less than or equal to the ticks_per_rotation for the overflow wheel 54. In this loop, the timer_message 60 is dequeued (at block 312) from the s_number slot and the enqueue_timer( )function is called (at block 314) to reenqueue the dequeued timer_message 60 to an appropriate wheel, as this timer_message 60 will expire within the rotation of the overflow wheel 54. If a timer_message 60 in the slot exceeds has a timeout_tick minus the c_tick that is greater than the ticks_per_rotation of the overflow wheel 54, then that timer_message should remain queued in the slot that will be furthest away from the next current slot.

If the w_number is not the overflow wheel 54, then the processor 4 dequeues (at block 318) all timer_messages 60 in the s_number slot. For each timer_message dequeued at block 318, the processor 4 performs a loop at blocks 320 to 328 in FIG. 10. Within this loop, the processor 4 determines (at block 322) whether the timeout_tick 68 for the timer_message 70 is the absolute current time (c_tick). If so, the timer_action 66 is performed as this timer has expired. Otherwise, the processor 4 calls the enqueue_timer( ) function to reenqueue the timer message 60 in the appropriate slot in one of the timing wheel. At block 328, control proceeds back to block 320 if there are further timer_messages in the slot to consider.

If (at block 330) all processed timer_messages were dequeued from the slot, then the bit in the entry in the active slot array 82 for the w_number wheel is set (at block 332) to "off". From the "no" branch of 330 or block 332 or block 316, control transfers to block 334 in FIG. 11 where the processor 4 determines the earliest slot_timeout_tick for the w_number wheel including active timers. This determination may be made from the active slot array 82. The result of this determination may be a NULL value if there are no further slots in the w_number wheel having active timers. The entry in the earliest timeout array 80 for the w_number wheel is set (at block 336) to the earliest slot_timeout_tick determined at block 334. The processor 4 then determines (at block 338) the earliest timeout value in entire earliest timeout array 80 across all wheel numbers and determines (at block 340) the wheel number having the earliest timeout value. The earliest timeout wheel number 84 is set (at block 342) to the determined wheel number and the decrementer 14 is set (at block 344) to the determined earliest timeout value.

Preferred embodiments thus provide data structures and algorithm for managing how timers are enqueued in timing wheels. The technique of the preferred embodiments is particularly advantageous because the system processor is not interrupted upon each tick, but only when a particular timer related function is called or the earliest timer in the wheels 50–54 expires, as indicated by the decrementer 14 reaching zero. Only upon the occurence of these events, which may occur after the passage of numerous ticks, the processor is interrupted to perform specific timer related actions. Preferred embodiments provide algorithms and data structures for managing timers in the hierarchal timing wheels.

Conclusion

This concludes the description of the preferred embodiments of the invention. The following describes some alternative embodiments for accomplishing the present invention.

The preferred embodiments may be implemented as a method, apparatus or program using standard programming and/or engineering techniques to produce software, firmware, hardware, or any combination thereof. The program, code and instructions in which the preferred embodiments are implemented are accessible from and embedded in an information bearing medium, which may comprise one or more computer-readable devices, firmware, programmable logic, memory devices (e.g., EEPROMs, ROMs, PROMs, RAMs, SRAMs, etc.), hardware, electronic devices, a computer readable magnetic storage unit, CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention.

Preferred embodiments described particular binary operations that may be performed to calculate certain of the values used in the logic of FIGS. 5–11. In alternative embodiments, different equations, data structures, and variables may be involved in calculating any values used with the logic of FIGS. 5–11.

The described embodiments used three timing wheels, each having 64 slots. In further embodiments, any number of timing wheels may be used, each having more or less slots than the timing wheels described herein.

Particular data structures were described, such as the timer_message 60, earliest timeout array 80, earliest timeout wheel number 82, and active slot array 84. In further embodiments, additional, fewer or different fields may be used with these data structures. Still further, the information maintained in these data structures may be maintained in fewer or more additional data structures that provide the information the logic needs to manage the timers.

In summary, preferred embodiments disclose a method, system, program, and data structures for managing timers in timing wheel data structures in a computer readable medium. Each timer is enqueued in one slot in one of multiple timing wheels. Each timing wheel includes multiple slots and each slot is associated with a time value. Each slot is capable of queuing one or more timers. Each timer indicates a timeout value at which the timer expires. A register is decremented to zero and a determination is made of a current time. A determination is further made, in response to decrementing the register to zero, of a slot having a time value that expires at the determined current time. All timers in the determined slot having a timeout value expiring at the current time are then dequeued.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing timers in timing wheel data structures implemented in a computer readable medium, comprising:

enqueueing each timer in one slot in one of multiple timing wheels, wherein each timing wheel includes multiple slots, wherein each slot is associated with a time value, wherein each slot is capable of queuing one or more timers, and wherein each timer indicates a timeout value at which the timer expires, decrementing a decrement register to zero;

determining a current time;

determining, in response to decrementing the decrement register to zero, a slot having a time value that expires at the determined current time; and dequeueing all timers in the determined slot having a timeout value expiring at the current time.

2. A method for managing timers in timing wheel data structures implemented in a computer readable medium, comprising:

enqueueing each timer in one slot in one of multiple timing wheels, wherein each timing wheel includes multiple slots, wherein each slot is associated with a time value, wherein each slot is capable of queuing one or more timers, and wherein each timer indicates a timeout value at which the timer expires.

decrementing a decrement register to zero, wherein the decrement register is set to a time value associated with one slot including at least one timer that will expire before the time values associated with other slots including timers determining a current time;

determining, in response to decrementing the decrement register to zero, a slot having a time value that expires at the determined current time; and dequeueing all timers in the determined slot having a timeout value expiring at the current time.

3. The method of claim 1, wherein enqueuing the timer further comprises:

determining a slot in one wheel having a time value that includes the timeout value associated with the timer, wherein the timer is enqueued in the determined slot.

4. The method of claim 3, wherein a first wheel includes one slot for each time value, and wherein a second wheel includes slots that each include a number of time values equal to all the slots in the first wheel.

5. The method of claim 4, wherein a third wheel comprises an overflow wheel that includes slots that each include a number of time values equal to all the slots in the second wheel, and wherein the overflow wheel slots are capable of including timers having timeout values that remain in the overflow wheel more than one rotation of the overflow wheel.

6. The method of claim 5, wherein determining the slot in the overflow wheel capable of including the timeout value associated with the timer comprises:

determining whether the timeout value for the timer being enqueued exceeds a time value for one complete rotation of the overflow wheel; and enqueuing the timer in the slot that is one rotation a way from the slot in the overflow wheel associated with the determined current time.

7. A method for managing timers in timing wheel data structures implemented in a computer readable medium, comprising:

enqueueing each timer in one slot in one of multiple timing wheels, wherein each timing wheel includes multiple slots, wherein each slot is associated with a time value, wherein each slot is capable of queuing one or more timers, and wherein each timer indicates a timeout value at which the timer expires, indicating in an earliest timer data structure an earliest timeout value of one timer enqueued in one slot of one of the wheels, wherein the earliest timer data structure is used to determine the slot associated with a time value that expires at the determined current time decrementing a decrement register to zero;

determining a current time;

determining, in response to decrementing the decrement resister to zero a slot having a time value that expires at the determined current time; and dequeueing all timers in the determined slot having a timeout value expiring at the current time.

8. The method of claim 7, further comprising:

determining one slot including at least one timer that is associated with a time value that expires before the time values associated with all other slots including at least one timer after dequeueing one or more timers; and setting the earliest timeout value in the earliest timer data structure to the time value associated with the determined slot.

9. The method of claim 8, further comprising:

resetting the decrement register to the earliest timeout value set in the earliest timer data structure.

10. The method of claim 7, further comprising:

receiving a call to stop one subject timer;

removing the subject timer from one slot in one timing wheel;

determining a slot including a timer associated with a time value that expires before the time value of any other slot if the time value associated with the slot from which the subject timer was removed is indicated as the earliest timeout value; and setting the earliest time value in the earliest timer data structure to the time value associated with the determined slot.

11. The method of claim 10, further comprising:

returning a handle to a program requesting an enqueued timer, wherein the handle includes a pointer to the enqueued timer, and wherein the program uses the handle with a call to stop the enqueued timer.

12. A system for managing timers, comprising:

a processor;

a memory device, wherein the processor is capable of accessing the memory device;

a decrement register, wherein the processor is capable of accessing the register;

a system clock;

a plurality of timing wheel data structures implemented in the memory device, wherein each timing wheel includes multiple slots, wherein each slot is associated with a time value, wherein each slot is capable of queuing one or more timers, and wherein each timer indicates a timeout value at which the timer expires;

program logic embedded in a computer readable medium including code capable of causing the processor to perform:

(i) enqueueing each timer in one slot in one of multiple timing wheels;

(ii) decrementing the decrement register to zero;

(iii) determining a current time from the system clock;

(iv) determining, in response to decrementing the decrement register to zero, a slot having a time value that expires at the determined current time; and (v) dequeueing all timers in the determined slot having a timeout value expiring at the current time.

13. A system for managing timers, comprising:

a processor:

a memory device, wherein the processor is capable of accessing the memory device;

a decrement register, wherein the processor is capable of accessing the register;

a system clock;

a plurality of timing wheel data structures implemented in the memory device, wherein each timing wheel includes multiple slots, wherein each slot is associated with a time value, wherein each slot is capable of queuing one or more timers, and wherein each timer indicates a timeout value at which the timer expires;

program logic embedded in a computer readable medium including code capable of causing the processor to perform:

(i) enqueueing each timer in one slot in one of multiple timing wheels;

(ii) setting the decrement register to a time value associated with one slot including at least one timer that will expire before the time values associated with other slots including timers (iii) decrementing the decrement register to zero;

(iv) determining a current time from the system clock;

(v) determining, in response to decrementing the decrement register to zero, a slot having a time value that expires at the determined current time; and (vi) dequeueing all timers in the determined slot having a timeout value expiring at the current time.

14. The system of claim 12, wherein enqueuing the timer further comprises:

determining a slot in one wheel having a time value that includes the timeout value associated with the timer, wherein the timer is enqueued in the determined slot.

15. The system of claim 14, wherein a first wheel includes one slot for each time value, and wherein a second wheel includes slots that each include a number of time values equal to all the slots in the first wheel.

16. The system of claim 15, wherein a third wheel comprises an overflow wheel that includes slots that each include a number of time values equal to all the slots in the second wheel, and wherein the overflow wheel slots are capable of including timers having timeout values that remain in the overflow wheel more than one rotation of the overflow wheel.

17. The system of claim 16, wherein determining the slot in the overflow wheel capable of including the timeout value associated with the timer comprises:

determining whether the timeout value for the timer being enqueued exceeds a time value for one complete rotation of the overflow wheel; and enqueuing the timer in the slot that is one rotation a way from the slot in the overflow wheel associated with the determined current time.

18. A system for managing timers, comprising:

a processor;

a memory device, wherein the processor is capable of accessing the memory device;

a decrement register, wherein the processor is capable of accessing the register;

a system clock;

a plurality of timing wheel data structures implemented in the memory device, wherein each timing wheel includes multiple slots, wherein each slot is associated with a time value, wherein each slot is capable of queuing one or more timers, and wherein each timer indicates a timeout value at which the timer expires;

program logic embedded in a computer readable medium including code capable of causing the processor to perform:
  (i) enqueueing each timer in one slot in one of multiple timing wheels;
  (ii) indicating in an earliest timer data structure an earliest timeout value of one timer enqueued in one slot of one of the wheels, wherein the earliest timer data structure is used to determine the slot associated with a time value that expires at the determined current time
  (iii) decrementing the decrement register to zero;
  (iv) determining a current time from the system clock;
  (v) determining in response to decrementing the decrement register to zero, a slot having a time value that expires at the determined current time; and
  (vi) dequeueing all timers in the determined slot having a timeout value expiring at the current time.

19. The system of claim 18, wherein the program logic is further capable of causing the processor to perform determining one slot including at least one timer that is associated with a time value that expires before the time values associated with all other slots including at least one timer after dequeueing one or more timers; and setting the earliest timeout value in the earliest timer data structure to the time value associated with the determined slot.

20. The system of claim 19, wherein the program code is further capable of causing the processor to perform:

resetting the decrement register to the earliest timeout value set in the earliest timer data structure.

21. The system of claim 18, wherein the program logic is further capable of causing the processor to perform:

receiving a call to stop one subject timer;

removing the subject timer from one slot in one timing wheel;

determining a slot including a timer associated with a time value that expires before the time value of any other slot if the time value associated with the slot from which the subject timer was removed is indicated as the earliest timeout value; and setting the earliest time value in the earliest timer data structure to the time value associated with the determined slot.

22. The system of claim 21, wherein the program logic is further capable of causing the processor to perform:

returning a handle to a program requesting an enqueued timer, wherein the handle includes a pointer to the enqueued timer, and wherein the program uses the handle with a call to stop the enqueued timer.

23. A program for managing timers in timing wheel data structures, wherein the program includes code embedded in a computer readable medium that is capable of causing a processor to perform:

enqueueing each timer in one slot in one of multiple timing wheels, wherein each timing wheel includes multiple slots, wherein each slot is associated with a time value, wherein each slot is capable of queuing one or more timers, and wherein each timer indicates a timeout value at which the timer expires;

decrementing a decrement register to zero;

determining a current time;

determining, in response to decrementing the decrement register to zero, a slot having a time value that expires at the determined current time; and dequeueing all timers in the determined slot having a timeout value expiring at the current time.

24. A program for managing timers in timing wheel data structures, wherein the program includes code embedded in a computer readable medium that is capable of causing a processor to perform:

enqueueing each timer in one slot in one of multiple timing wheels, wherein each timing wheel includes multiple slots, wherein each slot is associated with a time value, wherein each slot is capable of queuing one or more timers, and wherein each timer indicates a timeout value at which the timer expires;

decrementing a decrement register to zero, wherein the decrement register is set to a time value associated with one slot including at least one timer that will expire before the time values associated with other slots including timers determining a current time;

determining, in response to decrementing the decrement register to zero, a slot having a time value that expires at the determined current time; and dequeueing all timers in the determined slot having a timeout value expiring at the current time.

25. The program of claim 23, wherein enqueuing the timer further comprises:

determining a slot in one wheel having a time value that includes the timeout value associated with the timer, wherein the timer is enqueued in the determined slot.

26. The program of claim 25, wherein a first wheel includes one slot for each time value, and wherein a second wheel includes slots that each include a number of time values equal to all the slots in the first wheel.

27. The program of claim 26, wherein a third wheel comprises an overflow wheel that includes slots that each include a number of time values equal to all the slots in the second wheel, and wherein the overflow wheel slots are capable of including timers having timeout values that remain in the overflow wheel more than one rotation of the overflow wheel.

28. The program of claim 27, wherein determining the slot in the overflow wheel capable of including the timeout value associated with the timer comprises:

determining whether the timeout value for the timer being enqueued exceeds a time value for one complete rotation of the overflow wheel; and enqueuing the timer in the slot that is one rotation a way from the slot in the overflow wheel associated with the determined current time.

29. A program for managing timers in timing wheel data structures, wherein the program includes code embedded in a computer readable medium that is capable of causing a processor to perform:

enqueueing each timer in one slot in one of multiple timing wheels, wherein each timing wheel includes multiple slots, wherein each slot is associated with a time value, wherein each slot is capable of queuing one or more timers, and wherein each timer indicates a timeout value at which the timer expires;

indicating in an earliest timer data structure an earliest timeout value of one timer enqueued in one slot of one of the wheels, wherein the earliest timer data structure is used to determine the slot associated with a time value that expires at the determined current time decrementing a decrement register to zero;

determining a current time;

determining, in response to the decrement register to zero, a slot having a time value that expires at the determined current time; and dequeueing all timers in the determined slot having a timeout value expiring at the current time.

30. The program of claim 29, wherein the program code is further capable of causing the processor to perform:

determining one slot including at least one timer that is associated with a time value that expires before the time values associated with all other slots including at least one timer after dequeueing one or more timers; and setting the earliest timeout value in the earliest timer data structure to the time value associated with the determined slot.

31. The program of claim 30, wherein the decrement resister is set to a time value associated with one slot including at least one timer that will expire before the time values associated with other slots including timers, and wherein the program code is further capable of causing the processor to perform:

resetting the decrement register to the earliest timeout value set in the earliest timer data structure.

32. The program of claim 29, wherein the program code is further capable of causing the processor to perform:

receiving a call to stop one subject timer;

removing the subject timer from one slot in one timing wheel;

determining a slot including a timer associated with a time value that expires before the time value of any other slot if the time value associated with the slot from which the subject timer was removed is indicated as the earliest timeout value; and setting the earliest time value in the earliest timer data structure to the time value associated with the determined slot.

33. The program of claim 32, wherein the program code is further capable of causing the processor to perform:

returning a handle to a program requesting an enqueued timer, wherein the handle includes a pointer to the enqueued timer, and wherein the program uses the handle with a call to stop the enqueued timer.

34. A computer readable medium including data structures for use in managing timers, comprising:

a decrement register;

timing wheel data structures, wherein each timing wheel includes multiple slots, wherein each slot is associated with a time value, wherein each slot is capable of queuing one or more timers;

a plurality of timers enqueued in one slot in one of multiple timing wheels, wherein each timer indicates a timeout value at which the timer expires, wherein a determination is made, in response to decrementing the decrement register to zero, of a slot having a time value that expires at a determined current time, and wherein all timers in the determined slot having a timeout value expiring at the current time are dequeued.

35. The computer readable medium of claim 34, wherein enqueuing the timer further comprises determining a slot in one wheel having a time value that includes the timeout value associated with the timer, wherein the timer is enqueued in the determined slot.

36. The computer readable medium of claim 35, wherein a first wheel includes one slot for each time value, and wherein a second wheel includes slots that each include a number of time values equal to all the slots in the first wheel.

37. The computer readable medium of claim 36, wherein a third wheel comprises an overflow wheel that includes slots that each include a number of time values equal to all the slots in the second wheel, and wherein the overflow wheel slots are capable of including timers having timeout values that remain in the overflow wheel more than one rotation of the overflow wheel.

38. A computer readable medium including data structures for use in managing timers; comprising:

a decrement register;

timing wheel data structures, wherein each timing wheel includes multiple slots, wherein each slot is associated with a time value, wherein each slot is capable of queuing one or more timers;

a plurality of timers enqueued in one slot in one of multiple timing wheels, wherein each timer indicates a timeout value at which the timer expires, wherein a determination is made, in response to decrementing the decrement register to zero, of a slot having a time value that expires at a determined current time, and wherein all timers in the determined slot having a timeout value expiring at the current time are dequeued; and an earliest timer data structure indicating an earliest timeout value of one timer enqueued in one slot of one of the wheels, wherein the earliest timer data structure is used to determine the slot associated with a time value that expires at the determined current time.

* * * * *